United States Patent
Sakabe

(10) Patent No.: US 11,440,491 B2
(45) Date of Patent: Sep. 13, 2022

(54) VEHICLE COOLING SYSTEM AND WIRE HARNESS COOLING STRUCTURE

(71) Applicant: Yazaki Corporation, Tokyo (JP)

(72) Inventor: Takashi Sakabe, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 426 days.

(21) Appl. No.: 16/840,294

(22) Filed: Apr. 3, 2020

(65) Prior Publication Data

US 2020/0353791 A1   Nov. 12, 2020

(30) Foreign Application Priority Data

May 7, 2019   (JP) .............................. JP2019-087389

(51) Int. Cl.
  *B60L 58/27*   (2019.01)
  *B60L 58/26*   (2019.01)
  *B60K 11/02*   (2006.01)
  *B60R 16/02*   (2006.01)
  *B60K 11/04*   (2006.01)

(52) U.S. Cl.
  CPC .......... *B60R 16/0215* (2013.01); *B60K 11/02* (2013.01); *B60K 11/04* (2013.01); *B60L 58/26* (2019.02)

(58) Field of Classification Search
  CPC . B60L 58/27; B60L 58/26; B60K 1/04; B60R 16/02
  See application file for complete search history.

(56) References Cited

U.S. PATENT DOCUMENTS

| | | | |
|---|---|---|---|
| 2010/0100266 A1* | 4/2010 | Yoshinori | B60K 1/04 903/904 |
| 2015/0144414 A1* | 5/2015 | Tanigaki | B60K 1/04 180/291 |
| 2019/0111866 A1* | 4/2019 | Ito | B60R 16/02 |

FOREIGN PATENT DOCUMENTS

| | | |
|---|---|---|
| JP | 2004-148984 A | 5/2004 |
| JP | 2007-35364 A | 2/2007 |

* cited by examiner

*Primary Examiner* — Long T Tran
(74) *Attorney, Agent, or Firm* — Kenealy Vaidya LLP

(57) ABSTRACT

A vehicle cooling system includes a wire harness WH electrically connected to a plurality of heat-exchange target electric devices, a J/B electrically connected to the wire harness and a high-voltage battery, electric device medium pipes routed along a routing path of the wire harness and used for circulation of a heat exchange medium through the heat-exchange target electric devices, and a path switching unit connected to the electric device medium pipes so that the heat exchange medium can be circulated, and configured to form a heat exchange medium path in which the heat exchange medium is circulated through the plurality of heat-exchange target electric devices. The path switching unit is provided in the J/B and forms the heat exchange medium path according to a heat generation state of the heat-exchange target electric devices.

13 Claims, 9 Drawing Sheets

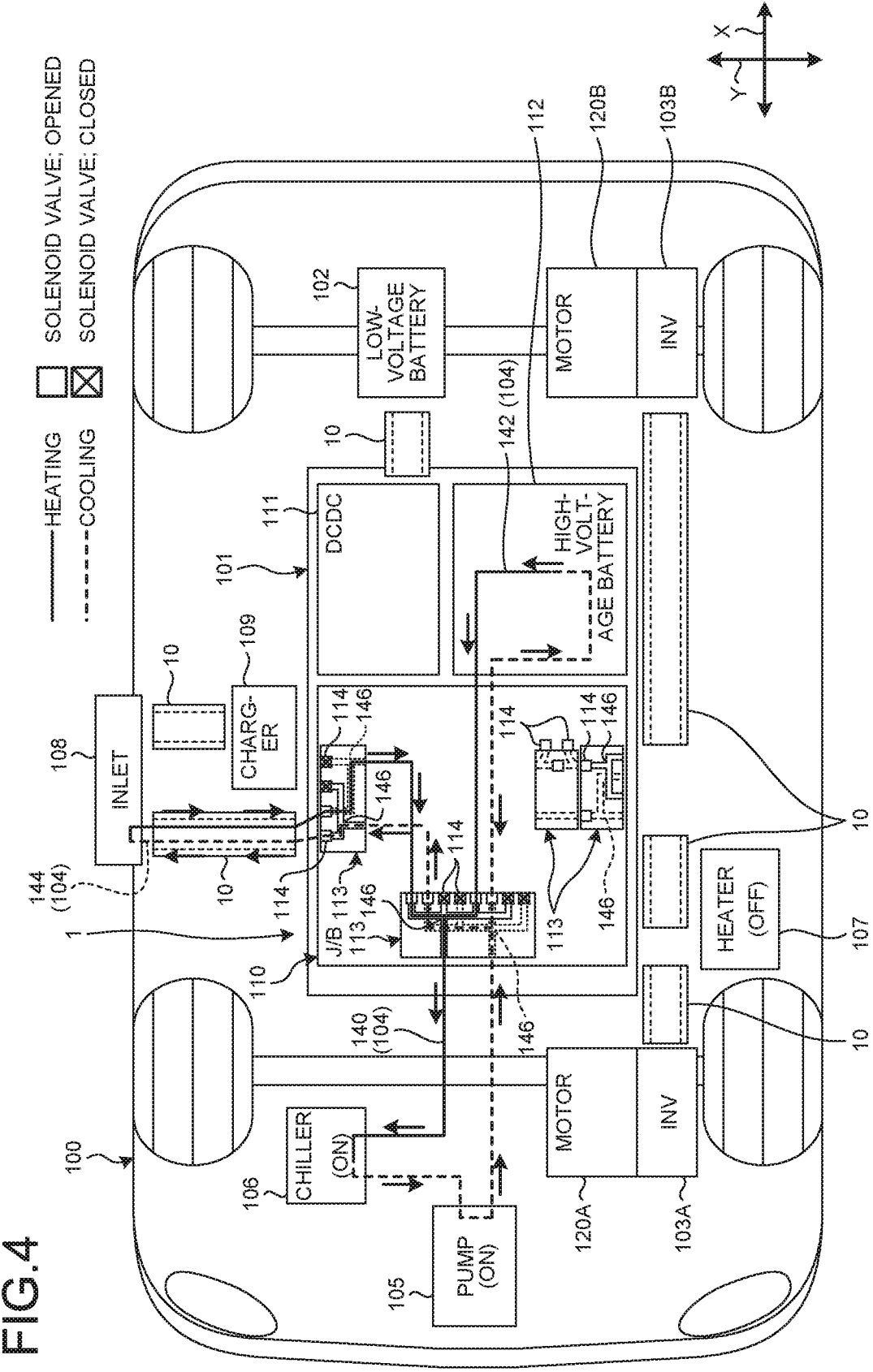

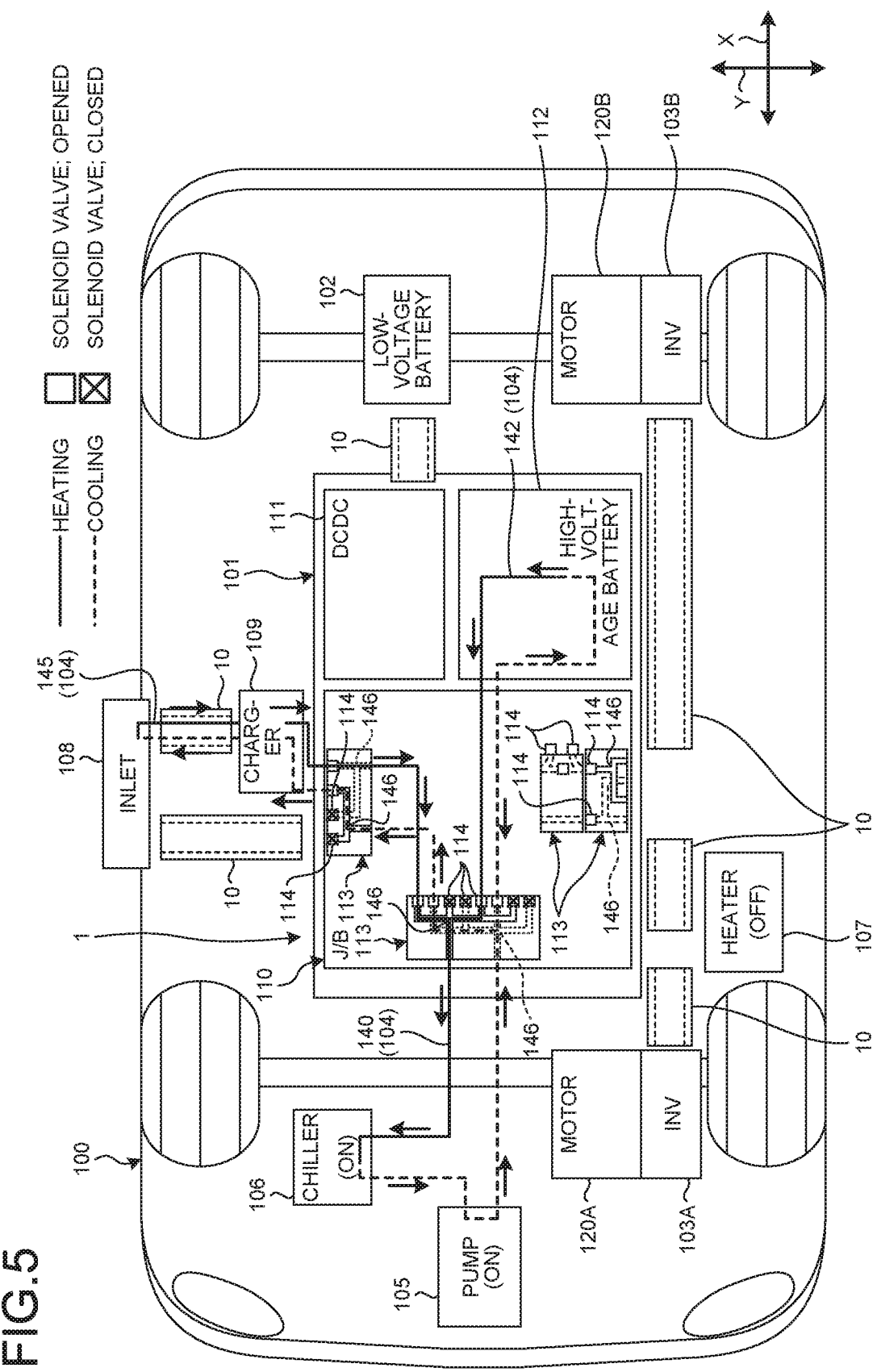

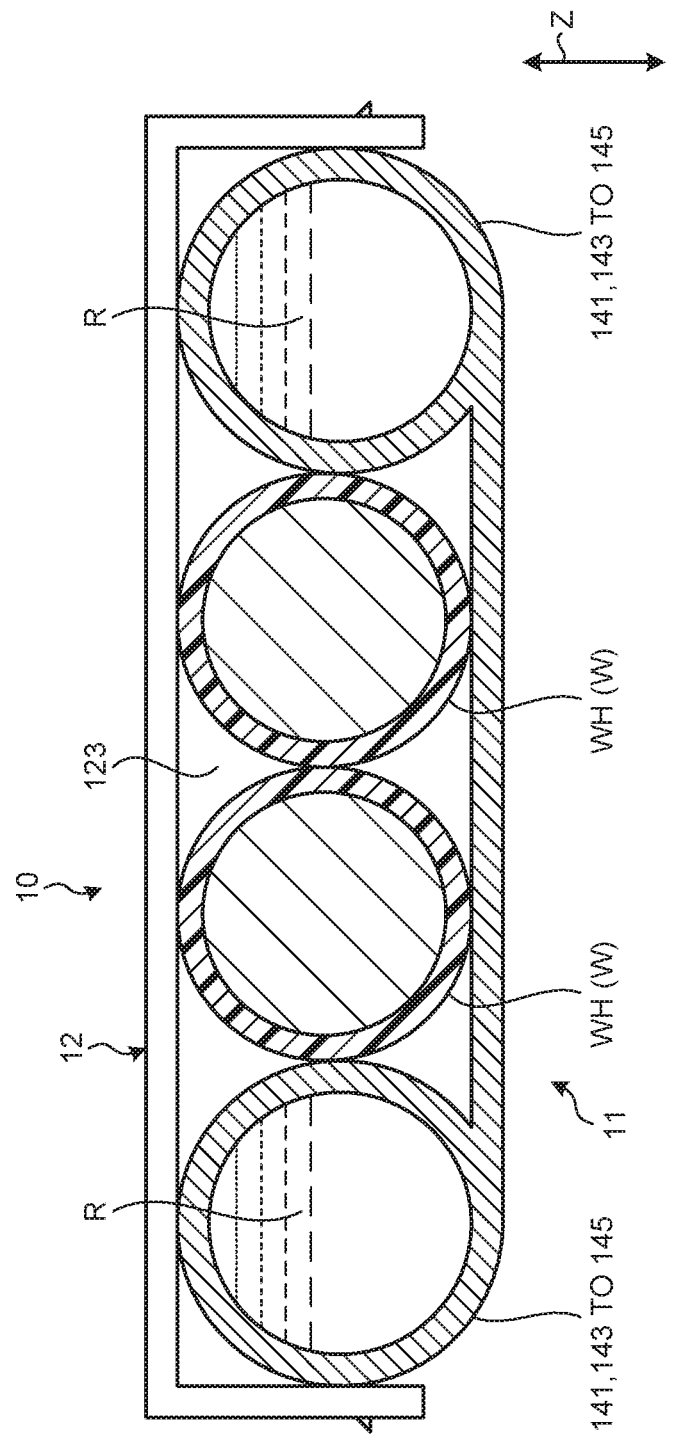

VEHICLE COOLING SYSTEM AND WIRE HARNESS COOLING STRUCTURE

CROSS-REFERENCE TO RELATED APPLICATION(S)

The present application claims priority to and incorporates by reference the entire contents of Japanese Patent Application No. 2019-087389 filed in Japan on May 7, 2019.

BACKGROUND OF THE INVENTION

1. Field of the Invention

The present invention relates to a vehicle cooling system and a wire harness cooling structure.

2. Description of the Related Art

In a vehicle such as an electric vehicle, heat is generated from electric devices such as a high-voltage battery and an inverter mounted on the vehicle and a wire harness that electrically connects the electric devices when the vehicle travels or is charged from the outside.

For example, Japanese Patent Application Laid-open No. 2007-035364 discloses a shield conductor that dissipates heat generated by a conductor itself to a vehicle body by using the conductor as a heat pipe in a wire harness that connects an inverter and a high-voltage battery in the vehicle. Japanese Patent Application Laid-open No. 2004-148984 discloses a power cable cooling device, in which a power cable housed in a housing is arranged at a position facing a motor with a cooling device interposed therebetween, and the power cable is cooled by the cooling device.

In a case where an energization current increases due to electrification of the vehicle, as a size (physique) of an electric device mounted on the vehicle or a diameter of the wire harness increases, a temperature of the electric device and the wire harness increases by energization.

Therefore, there is a demand for construction of an efficient cooling system.

SUMMARY OF THE INVENTION

An object of the present invention is to provide a vehicle cooling system and a wire harness cooling structure that can efficiently cool an electric device and a wire harness of which a temperature rises by energization in a vehicle.

In order to achieve the above mentioned object, a vehicle cooling system according to one aspect of the present invention includes a plurality of heat-exchange target electric devices that are mounted on a vehicle and perform heat exchange with a heat exchange medium; a wire harness that is electrically connected to the heat-exchange target electric devices; a high-voltage battery that supplies power to heat-exchange target electric devices that drive the vehicle among the plurality of heat-exchange target electric devices; a heat consuming device that consumes heat of the heat exchange medium; an electrical junction box that is electrically connected to the wire harness and the high-voltage battery; electric device medium pipes that are routed along a routing path of the wire harness and are used for circulation of the heat exchange medium through the heat-exchange target electric devices; a battery medium pipe that is used for circulation of the heat exchange medium through the high-voltage battery; and a path switching unit to which the electric device medium pipes, the battery medium pipe, and the heat consuming device are connected so that the heat exchange medium is circulatable and that forms a heat exchange medium path in which the heat exchange medium is circulated through at least two of the plurality of heat-exchange target electric devices, the high-voltage battery, and the heat consuming device, wherein the path switching unit is provided in the electrical junction box and forms the heat exchange medium path according to a heat generation state of the heat-exchange target electric devices.

According to another aspect of the present invention, in the vehicle cooling system, it is possible to configure that the electrical junction box is formed integrally with the high-voltage battery.

According to still another aspect of the present invention, in the vehicle cooling system, it is possible to configure that the heat-exchange target electric devices that drive the vehicle are inverters, and the path switching unit forms the heat exchange medium path in which the heat exchange medium is circulated through at least the inverters and the high-voltage battery at the time of a start of the vehicle.

According to still another aspect of the present invention, in the vehicle cooling system, it is possible to further include a heater that heats a heat exchange medium circulated in the electric device medium pipe between the inverters and the electrical junction box, wherein the heater is driven when the heat exchange medium path is formed at the time of the start of the vehicle.

According to still another aspect of the present invention, in the vehicle cooling system, it is possible to configure that one of the plurality of heat-exchange target electric devices is a connecter electrically connected to a charge/discharge device outside the vehicle, and the path switching unit forms the heat exchange medium path in which the heat exchange medium is circulated through at least the connecter and the high-voltage battery at the time of charging and discharging between the vehicle and the charge/discharge device.

In order to achieve the above mentioned object, a wire harness cooling structure according to one aspect of the present invention includes a wire harness that is electrically connected to heat-exchange target electric devices mounted on a vehicle and performing heat exchange with a heat exchange medium; electric device medium pipes that are routed along a routing path of the wire harness and used for circulation of a heat exchange medium through the heat-exchange target electric devices; a lower case that is formed by arranging two electric device medium pipes in parallel and connecting the two electric device medium pipes in a direction orthogonal to a direction in which the electric device medium pipes extend; and an upper case that closes an opening formed between the two electric device medium pipes, wherein the wire harness passes through an internal space formed in a state in which the lower case and the upper case are assembled.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic diagram illustrating a flow of the refrigerant in the vehicle cooling system at the time of fast charging;

FIG. 5 is a schematic diagram illustrating a flow of the refrigerant in the vehicle cooling system at the time of normal charging;

FIG. 7 is a cross-sectional view of the wire harness cooling structure accommodating a wire harness;

DETAILED DESCRIPTION OF THE PREFERRED EMBODIMENTS

Figure 1:
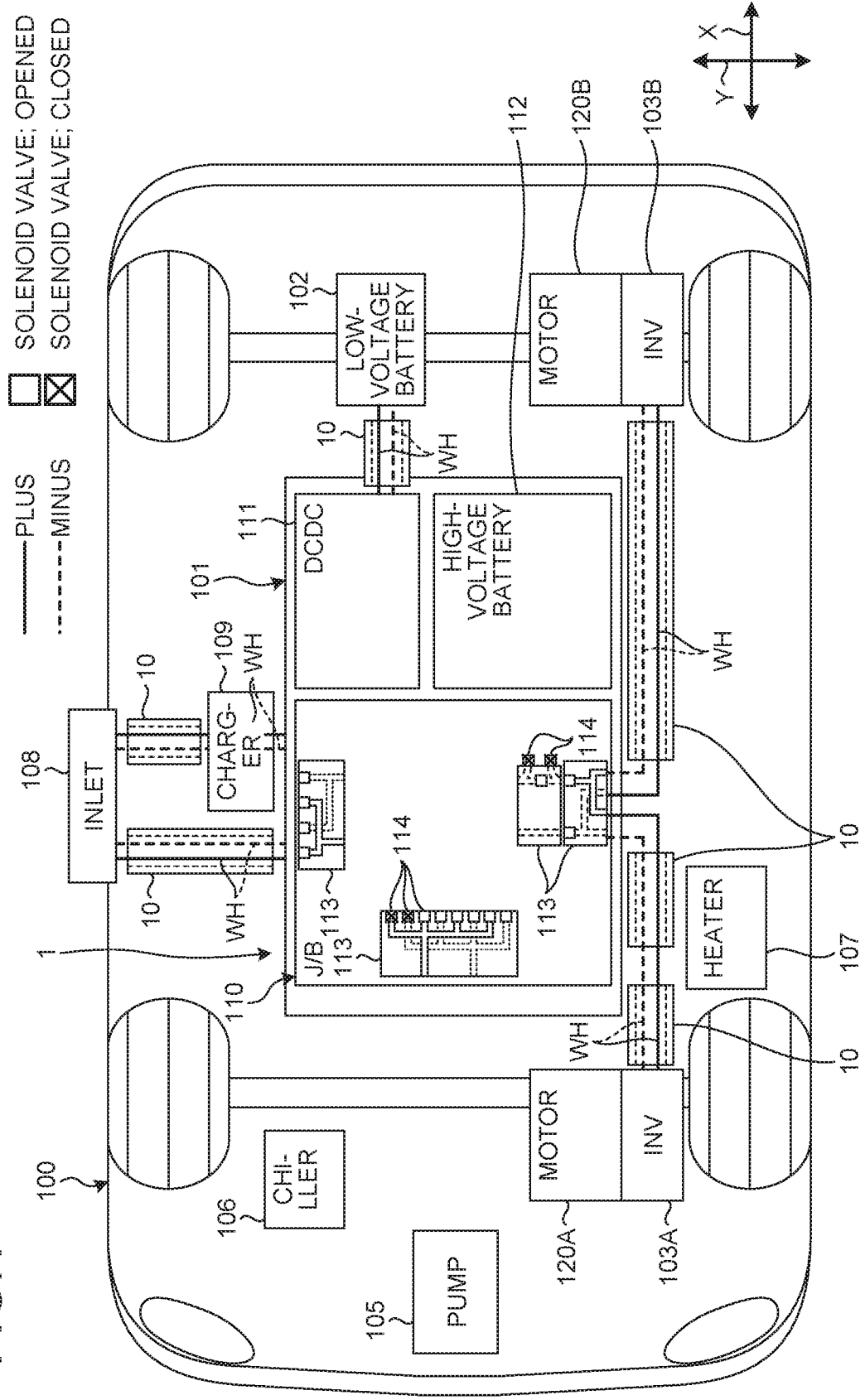
FIG. 1 is a schematic diagram illustrating a schematic configuration of a vehicle to which a vehicle cooling system according to an embodiment is applied.

Hereinafter, embodiments of a vehicle cooling system and a wire harness cooling structure according to the present invention will be described in detail with reference to the drawings. Note that the present invention is not limited by the following embodiments. Components in the following embodiments include those that can be easily assumed by those skilled in the art or those that are substantially the same. Further, the components in the following embodiments can be variously omitted, replaced, or changed without departing from the spirit of the present invention.

Embodiment

A vehicle cooling system and a wire harness cooling structure according to an embodiment of the present invention will be described with reference to FIGS. 1 to 10. A vehicle cooling system 1 of the present embodiment is mounted on a vehicle 100 and cools heat-exchange target electric devices 2 among a plurality of electric devices, an electric wire W, and a wire harness WH, or heat some of the heat-exchange target electric devices 2 as needed. The vehicle 100 is, for example, an electric vehicle (EV). The vehicle cooling system 1 includes the heat-exchange target electric devices 2, the wire harness WH, a high-voltage battery 112, a chiller 106, a junction box (J/B) 110, a battery medium pipe 142, a battery heating medium pipe 142A, electric device medium pipes, and a path switching unit 113. Here, the electric device medium pipes include a converter medium pipe 141, an inverter medium pipe 143, a fast charging medium pipe 144, and a normal charging medium pipe 145.

Note that an X direction illustrated in FIGS. 1 to 5 is a front-rear direction of the vehicle 100 and corresponds to a full length direction of the vehicle 100. In the front-rear direction of the vehicle 100, a front side is defined as the front, and a rear side is defined as the rear. A Y direction is a direction orthogonal to the X direction, is a left-right direction of the vehicle 100, and corresponds to a full width direction of the vehicle 100. A Z direction illustrated in FIG. 7 is a direction orthogonal to the X direction and the Y direction, is a height direction of the vehicle 100, and corresponds to a vehicle height direction of the vehicle 100. Each direction used in the following description represents a direction in a state in which respective parts are assembled to each other unless otherwise specified.

The heat-exchange target electric devices 2 are, for example, mounted on the vehicle 100 and perform heat exchange with a heat exchange medium R. The heat-exchange target electric devices 2 include, for example, the high-voltage battery 112, a DC-DC converter 111, a low-voltage battery 102, inverters 103A and 103B, and an inlet 108.

The high-voltage battery 112 supplies power to a heat-exchange target electric devices 2 that drive the vehicle 100 among the plurality of heat-exchange target electric devices 2. The heat-exchange target electric devices 2 here are, for example, the inverters 103A and 103B. The high-voltage battery 112 is a storage battery that supplies direct current (DC) power having a relatively higher voltage in comparison to the low-voltage battery 102, and has a voltage of, for example, about 400 V to 1000 V. The high-voltage battery 112 is electrically connected to the J/B 110, supplies DC power to the inverters 103A and 103B via the J/B 110, and drives motors 120A and 120B with alternating current (AC) power converted by the inverters 103A and 103B. The high-voltage battery 112 is accommodated in a high-voltage battery unit 101 together with the J/B 110 and the DC-DC converter 111.

The DC-DC converter 111 raises or lowers a DC voltage. The DC-DC converter 111 is electrically connected to the J/B 110 and the low-voltage battery 102. The DC-DC converter 111 receives high-voltage DC power from the J/B 110, converts the DC power into low-voltage DC power suitable for the low-voltage battery 102, and outputs the low-voltage DC power to the low-voltage battery 102. Further, the DC-DC converter 111 receives low-voltage DC power from the low-voltage battery 102, converts the DC power into high-voltage DC power suitable for high-voltage battery 112, and outputs the high-voltage DC power to the J/B 110.

The low-voltage battery 102 is a storage battery that supplies DC power having a relatively lower voltage than that of the high-voltage battery 112, and has a voltage of, for example, about 12 V to 48 V. The low-voltage battery 102 is electrically connected to the DC-DC converter 111. The low-voltage battery 102 is connected to the DC-DC converter 111 via the wire harness WH to which a wire harness cooling structure 10 is applied.

The inverters 103A and 103B are the heat-exchange target electric devices 2 that drive the vehicle 100. The inverters 103A and 103B typically convert DC power supplied from the high-voltage battery 112 into AC power and supply the AC power to the motors 120A and 120B. The motors 120A and 120B are driven by AC power supplied by the inverters 103A and 103B to rotate wheels of vehicle 100.

The inlet 108 is a connecter, and is electrically connected to a charge/discharge device (not illustrated) outside the vehicle 100. The inlet 108 is electrically connected to the J/B 110 via two wire harnesses WH to which the wire harness cooling structure 10 is applied. As illustrated in FIG. 4, one wire harness WH is routed along the fast charging medium pipe 144. The other wire harness WH is routed along the normal charging medium pipe 145 as illustrated in FIG. 5.

The wire harness WH connects between the respective electric devices mounted on the vehicle 100. The wire harness WH includes a plurality of electric wires W used for power supply and signal communication. One end of each electric wire W is connected to an electronic component accommodated in the J/B 110. The other end of each electric wire W is connected to each electric device via a connector or the like. The wire harness WH of the present embodiment is electrically connected to the heat-exchange target electric devices 2. The wire harness cooling structure 10 is applied to a part of the wire harness WH that is electrically connected to the heat-exchange target electric devices 2.

Figure 6A:
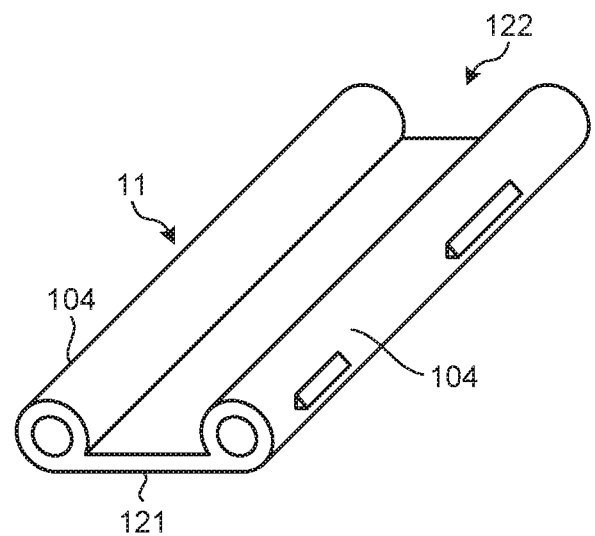
FIG. 6A is a perspective view illustrating a schematic configuration of a lower case of a wire harness cooling structure.
Figure 6B:
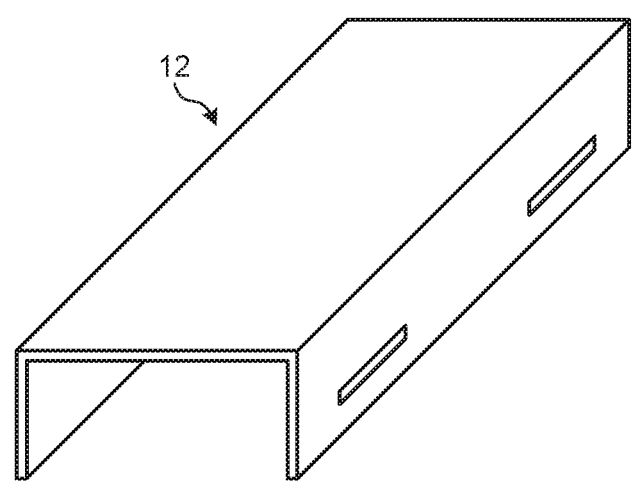
FIG. 6B is a perspective view illustrating a schematic configuration of an upper case of the wire harness cooling structure.

As illustrated in FIGS. 6A, 6B, and 7, the wire harness cooling structure 10 includes the wire harness WH, the electric device medium pipes 141 and 143 to 145, a lower case 11, and an upper case 12. The electric device medium pipe is formed in a pipe shape using a metal material such as aluminum (Al). The lower case 11 is formed by arranging two electric device medium pipes in parallel and connecting them in a direction orthogonal to a direction in which the electric device medium pipes extend. In the lower case 11, two electric device medium pipes are connected by a connection plate 121 in a tangential direction. The upper case 12 closes an opening 122 formed between the two electric device medium pipes. The wire harness WH passes through an internal space 123 formed in a state in which the lower case 11 and the upper case 12 are assembled. Note that although two electric wires W pass through the internal space 123 in FIG. 7, but the present invention is not limited thereto. One electric wire W and three or more electric wires W may pass through the internal space 123.

Figure 8:
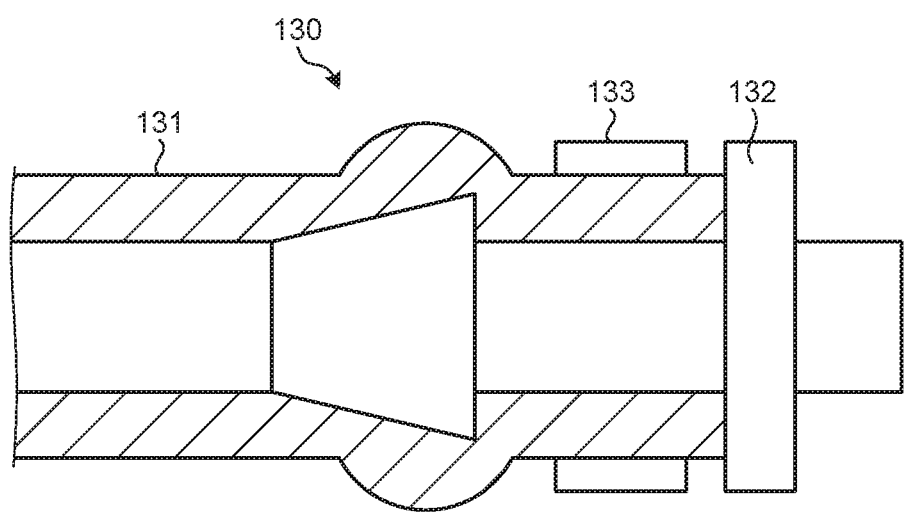
FIG. 8 is a cross-sectional view illustrating a schematic configuration of a connection port for connecting a path of the wire harness cooling structure.

The electric device medium pipe and the heat-exchange target electric device 2 are connected by a path connection port 130, for example, as illustrated in FIG. 8. In the path connection port 130, one opening side of a tube stop 132 is inserted into a pipe-shaped tube 131, such that the tube 131 and the tube stop 132 are connected to each other. The path connection port 130 is fastened by a metal band 133. For example, in the path connection port 130, the electric device medium pipe may be fixed to the tube stop 132 and the heat-exchange target electric device 2 may be connected to the tube 131, or vice versa.

The chiller 106 is a heat consuming device (heat exchanger) that takes heat (consumes heat) from the heat exchange medium R circulated in a heat exchange medium path 104. The chiller 106 is arranged on a chiller medium pipe 140 in the heat exchange medium path 104. The chiller medium pipe 140 is laid from the J/B 110, passes through the chiller 106 and a pump 105, and is directed to the J/B 110 again.

The pump 105 is a circulation pump, and pumps the heat exchange medium R in order to circulate the heat exchange medium R through the heat exchange medium path 104. Here, the heat exchange medium R is a so-called known refrigerant, such as Freon.

The J/B 110 is an electrical junction box, which is electrically connected to the wire harness WH and the high-voltage battery 112. The J/B 110 of the present embodiment is formed integrally with the high-voltage battery 112 as the high-voltage battery unit 101. The J/B 110 collectively accommodates electronic components such as connectors, fuses, relays, branch units, and electronic control units that constitute connection components such as the wire harness WH.

Figure 2:
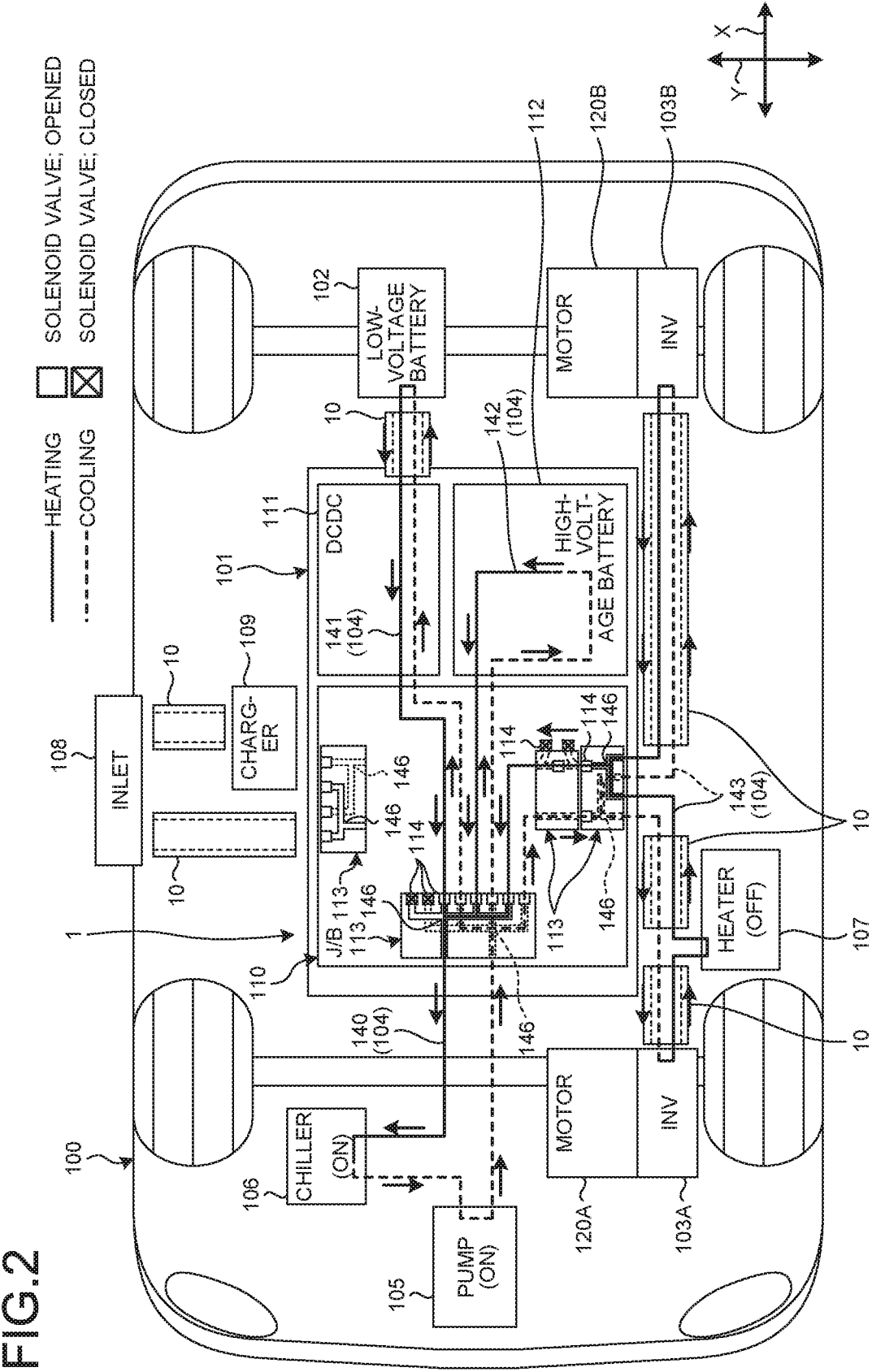
FIG. 2 is a schematic diagram illustrating a flow of a refrigerant in the vehicle cooling system at the time of traveling of the vehicle.
Figure 3:
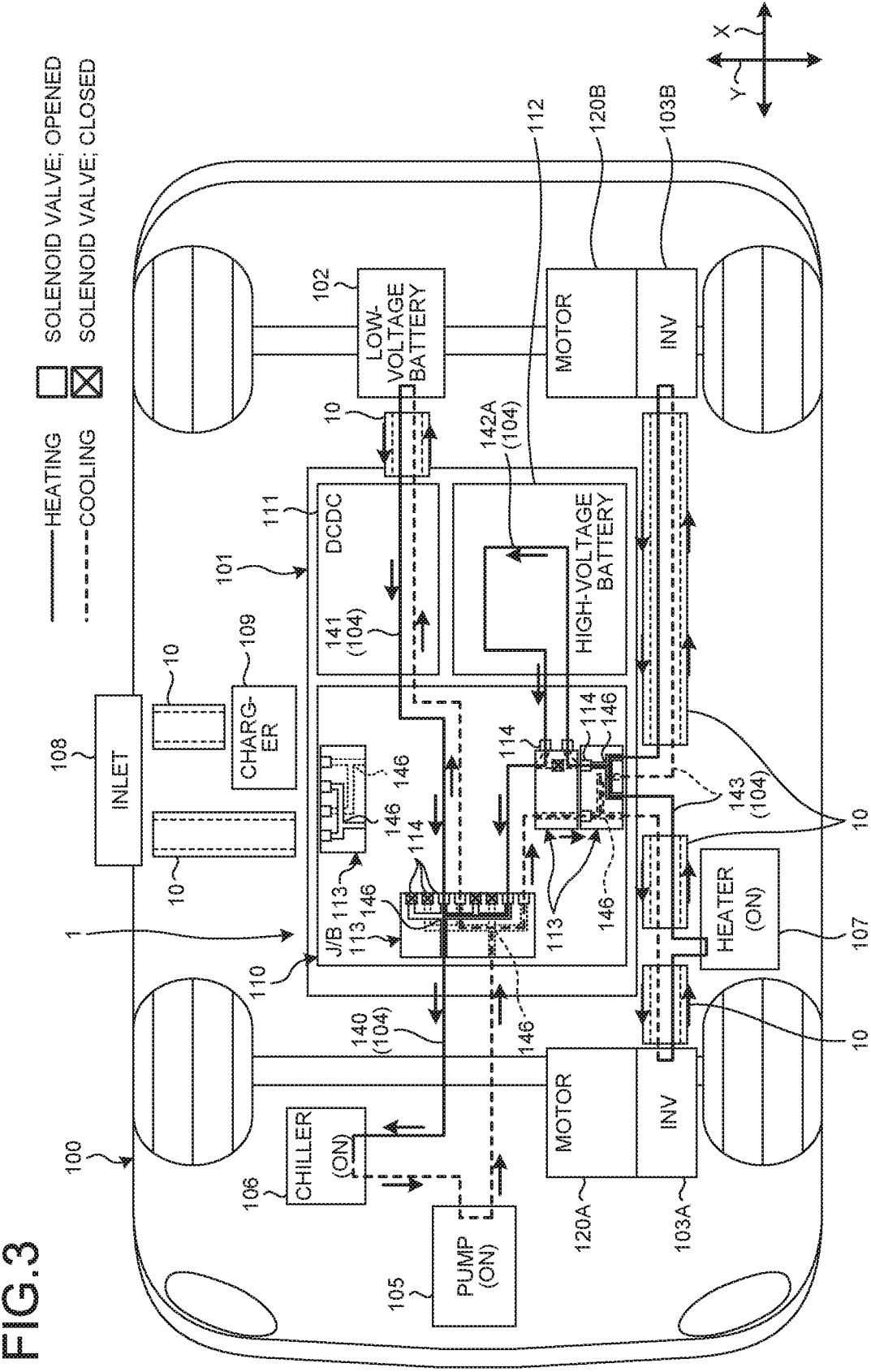
FIG. 3 is a schematic diagram illustrating a flow of the refrigerant in the vehicle cooling system at the time of a cold start of the vehicle.

The battery medium pipe 142 and the battery heating medium pipe 142A are used for circulation of the heat exchange medium R through the high-voltage battery 112, as illustrated in FIGS. 2 to 5. The battery medium pipe 142 and the battery heating medium pipe 142A are laid inside battery cells of the high-voltage battery 112. The battery medium pipe 142 and the battery heating medium pipe 142A are connected to the J/B 110 in the high-voltage battery unit 101. The battery medium pipe 142 is used for cooling the high-voltage battery 112, as illustrated in FIGS. 2, 4, and 5. In the battery medium pipe 142, the cooled heat exchange medium R is circulated to take heat from the high-voltage battery 112, for example, when the vehicle 100 is in a traveling state or in a charging state. Meanwhile, as illustrated in FIG. 3, the battery heating medium pipe 142A is used for heating of the high-voltage battery 112. In the battery heating medium pipe 142A, the heated heat exchange medium R is circulated to heat the high-voltage battery 112, for example, at the time of a cold start of the vehicle 100.

Some or all of the electric device medium pipes are routed along a routing path of the wire harness WH, and are used for circulation of the heat exchange medium R through the heat-exchange target electric devices 2. The converter medium pipe 141 is used for circulation of the heat exchange medium R through the DC-DC converter 111 and the low-voltage battery 102, as illustrated in FIGS. 2 and 3. The converter medium pipe 141 is routed between the J/B 110 and the low-voltage battery 102 along the routing path of the wire harness WH with the wire harness cooling structure 10. The inverter medium pipes 143 are used for circulation of the heat exchange medium R through the inverters 103A and 103B, as illustrated in FIGS. 2 and 3. The inverter medium pipes 143 are routed along the routing path of the wire harness WH with the wire harness cooling structure 10. The inverter medium pipes 143 are separately arranged on the front of the vehicle and the rear of the vehicle to correspond to the inverter 103A arranged on the front of the vehicle and the inverter 103B arranged on the rear of the vehicle, respectively. A heater 107 is connected to the inverter medium pipe 143 arranged on the front of the vehicle.

The heater 107 is arranged between the inverter 103A and the J/B 110, and heats the heat exchange medium R circulated in the inverter medium pipe 143 in an ON state (FIG. 3). The heater 107 is driven when the heat exchange medium path 104 is formed at the time of the cold start of the vehicle 100. The inverter medium pipe 143 arranged on the rear of the vehicle is arranged so that the heat exchange medium R is circulated through the inverter 103B without passing through the heater 107. As illustrated in FIG. 4, the fast charging medium pipe 144 is formed when the vehicle 100 and the charge/discharge device are charged/discharged. The fast charging medium pipe 144 is formed particularly when fast charging of the vehicle 100 is performed. The fast charging medium pipe 144 is routed along the routing path of the wire harness WH with the wire harness cooling structure 10. As illustrated in FIG. 5, the normal charging medium pipe 145 is formed when the vehicle 100 and the charge/discharge device are charged/discharged. The normal charging medium pipe 145 is formed particularly when the vehicle 100 is normally charged. The normal charging medium pipe 145 is routed along the routing path of the wire harness WH with the wire harness cooling structure 10. A charger 109 mounted on the vehicle 100 is connected to the normal charging medium pipe 145. The charger 109 is a so-called converter, and converts, for example, domestic AC power into DC power when a power plug for home use is connected to the inlet 108.

The inverter medium pipe 143 to the normal charging medium pipe 145, the battery medium pipe 142, and the chiller 106 are connected to the path switching unit 113 so that the heat exchange medium R can be circulated, and the heat exchange medium path 104 in which the heat exchange medium R is circulated through at least two or more of the plurality of heat-exchange target electric devices 2, the high-voltage battery 112, and the chiller 106 is formed. The path switching unit 113 is provided in the J/B 110, and forms the heat exchange medium path according to a heat generation state of the heat-exchange target electric devices 2. The path switching unit 113 includes a plurality of solenoid valves 114 forming the predetermined heat exchange medium path 104 and a plurality of pipe branching units 146. The path switching unit 113 switches each solenoid valve 114 arranged at a branch destination or a branch source of each pipe branching unit 146 to an open state or a closed state, thereby forming the heat exchange medium path 104 according to the heat generation state of the heat-exchange target electric devices 2. The path switching unit 113 is electrically connected to an electronic control unit (ECU, not illustrated) mounted on the vehicle 100, and some of the plurality of solenoid valves 114 are switched to the closed state or the open state according to a control signal from the ECU.

The path switching unit 113 forms the heat exchange medium path 104 such that the heat exchange medium R is circulated through the inverters 103A and 103B, the high-voltage battery 112, the DC-DC converter 111, and the low-voltage battery 102 at the time of traveling of the vehicle 100 (FIG. 2). The path switching unit 113 forms the heat exchange medium path 104 so that the heat exchange medium R is circulated in the converter medium pipe 141, the battery medium pipe 142, the inverter medium pipe 143, and the wire harness cooling structure 10 connected to a part thereof, at the time of traveling of the vehicle 100.

The path switching unit 113 forms the heat exchange medium path 104 in which the heat exchange medium R is circulated through the inverters 103A and 103B, the high-voltage battery 112, the DC-DC converter 111, and the low-voltage battery 102 at the time of a cold start of the vehicle 100 (FIG. 3). The path switching unit 113 forms the heat exchange medium path 104 so that the heat exchange medium R is circulated in the converter medium pipe 141, the battery heating medium pipe 142A, the inverter medium pipe 143, and the wire harness cooling structure 10 connected to a part thereof, at the time of the cold start of the vehicle 100. At the time of the cold start of the vehicle 100, the path switching unit 113 forms the heat exchange medium path 104 so that the heat exchange medium R heated by the inverters 103A and 103B and the heater 107 passes through the inverter medium pipe 143 and flows to the battery heating medium pipe 142A to heat the high-voltage battery 112.

The path switching unit 113 forms the heat exchange medium path 104 in which the heat exchange medium R is circulated through the inlet 108 and the high-voltage battery 112 at the time of charging and discharging between the vehicle 100 and the charge/discharge device (FIGS. 4 and 5). The path switching unit 113 forms the heat exchange medium path 104 so that the heat exchange medium R is circulated in the battery medium pipe 142, the fast charging medium pipe 144, and the wire harness cooling structure 10 connected to the fast charging medium pipe 144 at the time of fast charging between the vehicle 100 and the charge/discharge device. In addition, for example, the path switching unit 113 forms the heat exchange medium path 104 so that the heat exchange medium R is circulated in the battery medium pipe 142, the normal charging medium pipe 145, and the wire harness cooling structure 10 connected to the normal charging medium pipe 145 at the time of normal charging between the vehicle 100 and the charge/discharge device.

Next, a path switching control in the vehicle cooling system 1 will be described with reference to FIGS. 9 and 10. In this processing, the path switching unit 113 opens and closes some of the solenoid valves 114 according to the control signal from the ECU to form a desired heat exchange medium path 104.

Figure 9:
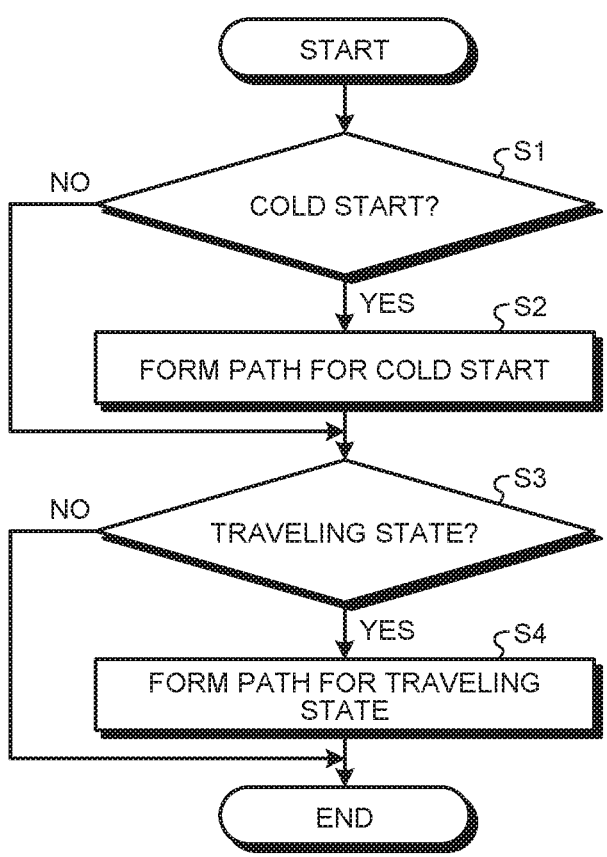
FIG. 9 is a flowchart illustrating an example of a path switching control in the vehicle cooling system.

In FIG. 9, in Step S1, the path switching unit 113 determines whether or not the vehicle 100 is performing a cold start based on a control signal from the ECU. For example, the ECU monitors a cell temperature of the high-voltage battery 112, and transmits a control signal to the path switching unit 113 when the detected cell temperature is equal to or lower than a threshold. In a case where it is determined in Step S1 that the vehicle 100 is not performing a cold start, the processing proceeds to Step S3. On the other hand, in a case where it is determined that the vehicle 100 is performing a cold start, the processing proceeds to Step S2.

In Step S2, the path switching unit 113 opens and closes solenoid valves 114 associated with the cold start of the vehicle 100 to form a heat exchange medium path 104 in which the heat exchange medium R is circulated through the inverters 103A and 103B, the high-voltage battery 112, the DC-DC converter 111, and the low-voltage battery 102 (FIG. 3), and the processing proceeds to Step S3. In Step S2, as described above, the path switching unit 113 forms the heat exchange medium path 104 so that the heat exchange medium R is circulated in the converter medium pipe 141, the battery heating medium pipe 142A, the inverter medium pipe 143, and the wire harness cooling structure 10 connected to a part thereof.

In Step S3, the path switching unit 113 determines whether or not the vehicle 100 is in the traveling state based on a control signal from the ECU. For example, the ECU monitors a vehicle speed of the vehicle 100, and transmits a control signal to the path switching unit 113 in a case where the detected vehicle speed is equal to or higher than a threshold. In a case where it is determined in Step S3 that the vehicle 100 is not in the traveling state, the processing ends. On the other hand, in a case where it is determined that the vehicle 100 is in the traveling state, the processing proceeds to Step S4.

In Step S4, the path switching unit 113 opens and closes solenoid valve 114 associated with the traveling state of the vehicle 100 to form a heat exchange medium path 104 so that the heat exchange medium R is circulated through the inverters 103A and 103B, the high-voltage battery 112, the DC-DC converter 111, and the low-voltage battery 102 (FIG. 2), and the processing ends. In Step S4, the path switching unit 113 forms the heat exchange medium path 104 so that the heat exchange medium R is circulated in the converter medium pipe 141, the battery medium pipe 142, the inverter medium pipe 143, and the wire harness cooling structure 10 connected to a part thereof.

Figure 10:
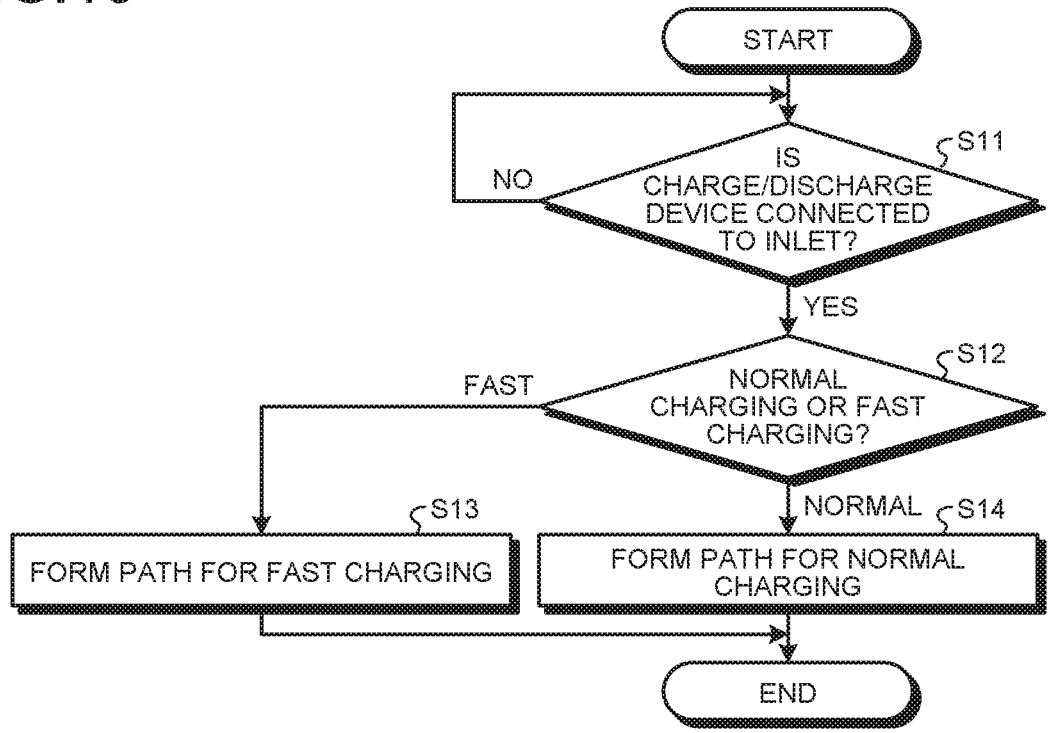
FIG. 10 is a flowchart illustrating another example of the path switching control in the vehicle cooling system.

In FIG. 10, in Step S11, the path switching unit 113 determines whether or not the charge/discharge device is connected to the inlet 108 based on a control signal from the ECU. In a case where it is determined in Step S11 that the charge/discharge device is not connected to the inlet 108, the processing stands by (NO in Step S11). On the other hand, in a case where it is determined that the charge/discharge device is connected to the inlet 108 (YES in Step S11), the processing proceeds to Step S12.

In Step S12, the path switching unit 113 determines whether the fast charging is performed or the normal charging is performed based on a control signal from the ECU. For example, the ECU detects a charging current value of the high-voltage battery 112 by using a current sensor (not illustrated), and determines that the fast charging is performed in a case where the detected charging current value exceeds a threshold (FAST in Step S12). Note that although a case where the ECU determines whether or not the fast charging is performed based on the charging current value of the high-voltage battery 112 has been described, but the present invention is not limited thereto. The ECU may determine whether or not the fast charging is performed according to a message received from the charge/discharge device when a charging gun for fast charging is attached to the inlet 108. In a case where it is determined in Step S12 that fast charging is performed (FAST in Step S12), the processing proceeds to Step S13. On the other hand, in a case where it is determined that the fast charging is not performed (NORMAL in Step S12), the processing proceeds to Step S14.

In Step S13, the path switching unit 113 opens and closes solenoid valves 114 associated with the fast charging of the vehicle 100 to form a heat exchange medium path 104 in which the heat exchange medium R is circulated through the inlet 108 and the high-voltage battery 112 used at the time of the fast charging (FIG. 4), and this processing ends. In Step S13, as described above, the path switching unit 113 forms the heat exchange medium path 104 so that the heat exchange medium R is circulated in the battery medium pipe 142, the fast charging medium pipe 144, and the wire harness cooling structure 10 connected to the fast charging medium pipe 144.

In Step S14, the path switching unit 113 opens and closes solenoid valves 114 associated with the normal charging of the vehicle 100 to form a heat exchange medium path 104 in which the heat exchange medium R is circulated through the inlet 108 and the high-voltage battery 112 used at the time of the normal charging (FIG. 5), and this processing ends. In Step S14, as described above, the path switching unit 113 forms the heat exchange medium path 104 so that the heat exchange medium R is circulated in the battery medium pipe 142, the normal charging medium pipe 145, and the wire harness cooling structure 10 connected to the normal charging medium pipe 145.

As described above, the vehicle cooling system 1 according to the present embodiment includes the wire harness WH which is electrically connected to the plurality of heat-exchange target electric devices 2, the J/B 110 which is electrically connected to the wire harness WH and the high-voltage battery 112, the electric device medium pipes which are routed along the routing path of the wire harness WH and used for circulation of the heat exchange medium R through the heat-exchange target electric devices 2, and the path switching unit 113 which is connected to the electric device medium pipes so that the heat exchange medium R can be circulated, and forms the heat exchange medium path 104 in which the heat exchange medium R is circulated through the plurality of heat-exchange target electric devices 2. The path switching unit 113 is provided in the J/B 110 and forms the heat exchange medium path 104 according to the heat generation state of the heat-exchange target electric devices 2.

With the above-described configuration, the vehicle cooling system 1 according to the present embodiment can efficiently cool the heat-exchange target electric devices 2 such as the high-voltage battery 112 and the inverters 103A and 103B, and the wire harness WH electrically connected to the heat-exchange target electric devices 2. Therefore, it is possible to suppress an increase in a size of the electric device and an increase in a diameter of the wire harness WH. As a result, it is possible to suppress an increase in the size of the entire electric device and the wire harness WH mounted on the vehicle 100, thereby contributing to a reduction in weight. In addition, since the electric device medium pipe used for circulation of the heat exchange medium R through the heat-exchange target electric devices 2 is routed along the path of the wire harness WH electrically connected to the heat-exchange target electric devices 2, the wire harness WH can be efficiently cooled, and the diameter of the electric wire W can be reduced as compared with a normal routing configuration. As a result, it is possible to save space for the routing path of the wire harness WH.

Further, in the vehicle cooling system 1 according to the present embodiment, since the J/B 110 is formed integrally with the high-voltage battery 112, the J/B 110 and the high-voltage battery 112 are not electrically connected by the long wire harness WH and application of the wire harness cooling structure 10 to the wire harness WH can be omitted. Therefore, routing work of the wire harness WH can be reduced and assembly work can be made more efficient, in addition to cost reduction.

Further, in the vehicle cooling system 1 according to the present embodiment, the path switching unit 113 forms the heat exchange medium path 104 in which the heat exchange medium R is circulated through the inverters 103A and 103B and the high-voltage battery 112 at the time of a start of the vehicle 100. Therefore, the heat exchange medium R can be heated by heat generated in the inverters 103A and 103B and the high-voltage battery 112 can be heated by circulating the heat exchange medium R through the high-voltage battery 112. As a result, for example, cold startability of the vehicle 100 can be improved.

Further, the vehicle cooling system 1 according to the present embodiment further includes the heater 107 that heats the heat exchange medium R circulated in the inverter medium pipe 143 between the inverters 103A and 103B and the J/B 110, and the heater 107 is driven when the heat exchange medium path 104 is formed at the time of the start of the vehicle 100. Since the heat exchange medium R heated by being circulated through the inverters 103A and 103B is further heated by the heater 107, the heated heat exchange medium R can be circulated through the high-voltage battery 112 at the time of the cold start of the vehicle 100 and a state of the high-voltage battery 112 at the time of the cold start can be improved.

Further, in the vehicle cooling system 1 according to the present embodiment, the path switching unit 113 forms the heat exchange medium path 104 in which the heat exchange medium R is circulated through the inlet 108 and the high-voltage battery 112 at the time of the charging and discharging between the vehicle 100 and the charge/discharge device. Accordingly, the heat exchange medium R can be circulated through the inlet 108 and the high-voltage battery 112 to thereby efficiently cool the inlet 108 and the high-voltage battery 112 at the time of the charging and discharging of the vehicle 100.

The wire harness cooling structure 10 according to the present embodiment includes the wire harness WH mounted on the vehicle 100 and electrically connected to the heat-exchange target electric devices 2, and the electric device medium pipes routed along the routing path of the wire harness WH and used for circulation of the heat exchange medium R through the heat-exchange target electric devices 2. The wire harness cooling structure 10 includes the lower case 11 and the upper case 12, and the wire harness WH passes through an internal space 123 formed in a state in which the lower case 11 and the upper case 12 are assembled. The lower case 11 is formed by arranging two electric device medium pipes in parallel and connecting them in a direction orthogonal to a direction in which the electric device medium pipes extend. The upper case 12 closes an opening 122 formed between the two electric device medium pipes. With the above-described configuration, the wire harness WH routed in the vehicle 100 and electrically connected to the heat-exchange target electric devices 2 can be efficiently cooled.

In the above-described embodiment, the ECU monitors the temperature of the battery cell of the high-voltage battery 112, and transmits a control signal to the path switching unit 113 when the detected cell temperature is equal to or lower than the threshold. However, the present invention is not limited thereto, and the path switching unit 113 may be configured to monitor the temperature of the battery cell of the high-voltage battery 112. Further, the ECU monitors the vehicle speed of the vehicle 100, and transmits a control signal to the path switching unit 113 when the detected vehicle speed is equal to or higher than the threshold. However, the present invention is not limited thereto and the path switching unit 113 may be configured to monitor the vehicle speed of the vehicle 100.

Further, in the above-described embodiment, the heat-exchange target electric devices 2 that drive the vehicle 100 are the inverters 103A and 103B. However, in a case where heat exchange with the heat exchange medium R is performed also for the motors 120A and 120B, the motors 120A and 120B may be the heat-exchange target electric devices 2.

In the above-described embodiment, the chiller 106 may be replaced with a radiator mounted on the vehicle 100, or may be used together with the radiator.

The vehicle cooling system and the wire harness cooling structure according to the present embodiment can efficiently cool the electric device and the wire harness of which a temperature rises by energization in a vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle cooling system comprising:
   a plurality of heat-exchange target electric devices that are mounted on a vehicle and perform heat exchange with a heat exchange medium;
   a wire harness that is electrically connected to the heat-exchange target electric devices;
   a high-voltage battery that supplies power to heat-exchange target electric devices that drive the vehicle among the plurality of heat-exchange target electric devices;
   a heat consuming device that consumes heat of the heat exchange medium;
   an electrical junction box that is electrically connected to the wire harness and the high-voltage battery;
   electric device medium pipes that are routed along a routing path of the wire harness and are used for circulation of the heat exchange medium through the heat-exchange target electric devices;
   a battery medium pipe that is used for circulation of the heat exchange medium through the high-voltage battery; and
   a path switching unit to which the electric device medium pipes, the battery medium pipe, and the heat consuming device are connected so that the heat exchange medium is circulatable and that forms a heat exchange medium path in which the heat exchange medium is circulated through at least two of the plurality of heat-exchange target electric devices, the high-voltage battery, and the heat consuming device, wherein
   the path switching unit is provided in the electrical junction box and forms the heat exchange medium path according to a heat generation state of the heat-exchange target electric devices.

2. The vehicle cooling system according to claim 1, wherein
   the electrical junction box is formed integrally with the high-voltage battery.

3. The vehicle cooling system according to claim 2, wherein
   the heat-exchange target electric devices that drive the vehicle are inverters, and
   the path switching unit forms the heat exchange medium path in which the heat exchange medium is circulated through at least the inverters and the high-voltage battery at the time of a start of the vehicle.

4. The vehicle cooling system according to claim 3, further comprising:
   a heater that heats a heat exchange medium circulated in the electric device medium pipe between the inverters and the electrical junction box, wherein
   the heater is driven when the heat exchange medium path is formed at the time of the start of the vehicle.

5. The vehicle cooling system according to claim 4, wherein
   one of the plurality of heat-exchange target electric devices is a connecter electrically connected to a charge/discharge device outside the vehicle, and
   the path switching unit forms the heat exchange medium path in which the heat exchange medium is circulated through at least the connecter and the high-voltage battery at the time of charging and discharging between the vehicle and the charge/discharge device.

6. The vehicle cooling system according to claim 3, wherein
   one of the plurality of heat-exchange target electric devices is a connecter electrically connected to a charge/discharge device outside the vehicle, and
   the path switching unit forms the heat exchange medium path in which the heat exchange medium is circulated through at least the connecter and the high-voltage battery at the time of charging and discharging between the vehicle and the charge/discharge device.

7. The vehicle cooling system according to claim 2, wherein
   one of the plurality of heat-exchange target electric devices is a connecter electrically connected to a charge/discharge device outside the vehicle, and
   the path switching unit forms the heat exchange medium path in which the heat exchange medium is circulated through at least the connecter and the high-voltage battery at the time of charging and discharging between the vehicle and the charge/discharge device.

8. The vehicle cooling system according to claim 1, wherein the heat-exchange target electric devices that drive the vehicle are inverters, and the path switching unit forms the heat exchange medium path in which the heat exchange medium is circulated through at least the inverters and the high-voltage battery at the time of a start of the vehicle.

9. The vehicle cooling system according to claim 8, further comprising:

a heater that heats a heat exchange medium circulated in the electric device medium pipe between the inverters and the electrical junction box, wherein the heater is driven when the heat exchange medium path is formed at the time of the start of the vehicle.

10. The vehicle cooling system according to claim 9, wherein one of the plurality of heat-exchange target electric devices is a connecter electrically connected to a charge/discharge device outside the vehicle, and the path switching unit forms the heat exchange medium path in which the heat exchange medium is circulated through at least the connecter and the high-voltage battery at the time of charging and discharging between the vehicle and the charge/discharge device.

11. The vehicle cooling system according to claim 8, wherein one of the plurality of heat-exchange target electric devices is a connecter electrically connected to a charge/discharge device outside the vehicle, and the path switching unit forms the heat exchange medium path in which the heat exchange medium is circulated through at least the connecter and the high-voltage battery at the time of charging and discharging between the vehicle and the charge/discharge device.

12. The vehicle cooling system according to claim 1, wherein one of the plurality of heat-exchange target electric devices is a connecter electrically connected to a charge/discharge device outside the vehicle, and the path switching unit forms the heat exchange medium path in which the heat exchange medium is circulated through at least the connecter and the high-voltage battery at the time of charging and discharging between the vehicle and the charge/discharge device.

13. A wire harness cooling structure comprising:

a wire harness that is electrically connected to heat-exchange target electric devices mounted on a vehicle and performing heat exchange with a heat exchange medium;

electric device medium pipes that are routed along a routing path of the wire harness and used for circulation of a heat exchange medium through the heat-exchange target electric devices;

a lower case that is formed by arranging two electric device medium pipes in parallel and connecting the two electric device medium pipes in a direction orthogonal to a direction in which the electric device medium pipes extend; and an upper case that closes an opening formed between the two electric device medium pipes, wherein the wire harness passes through an internal space formed in a state in which the lower case and the upper case are assembled.

* * * * *